(12) United States Patent
Ikeno et al.

(10) Patent No.: US 7,534,499 B2
(45) Date of Patent: May 19, 2009

(54) LIQUID SILICONE RUBBER COATING COMPOSITION, CURTAIN AIRBAG AND MAKING METHOD

(75) Inventors: Masayuki Ikeno, Annaka (JP); Hidenori Mizushima, Annaka (JP); Shigeru Ubukata, Annaka (JP); Mitsuhiro Iwata, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/617,904

(22) Filed: Dec. 29, 2006

(65) Prior Publication Data

US 2007/0166555 A1 Jul. 19, 2007

(30) Foreign Application Priority Data

Jan. 13, 2006 (JP) ............................. 2006-005817

(51) Int. Cl.
*B32B 9/04* (2006.01)
(52) U.S. Cl. ..................................... 428/447; 280/728.1
(58) Field of Classification Search .................. 526/32; 528/31; 524/588, 32; 428/447; 442/76; 280/728.1
See application file for complete search history.

(56) References Cited

U.S. PATENT DOCUMENTS 5,106,933 A 4/1992 Kobayashi et al.
5,877,256 A 3/1999 Nakamura et al.
6,387,520 B1 5/2002 Fujiki et al.
2005/0205829 A1* 9/2005 Magd et al. ................ 252/8.61

FOREIGN PATENT DOCUMENTS

| EP | 0 669 419 A1 * | 8/1995 |
| JP | 3-37265 | 2/1991 |
| JP | 5-214295 | 8/1993 |
| JP | 2001-59052 | 3/2001 |
| JP | 2001-287610 | 10/2001 |
| JP | 2002-138249 | 5/2002 |

OTHER PUBLICATIONS

U.S. Appl. No. 12/181,682, filed Jul. 29, 2008, Ikeno, et al.
U.S. Appl. No. 11/758,436, filed Jun. 5, 2007, Mizushima, et al.

* cited by examiner

*Primary Examiner*—Arti Singh
(74) *Attorney, Agent, or Firm*—Oblon, Spivak, McClelland, Maier & Neustadt, P.C.

(57) ABSTRACT

A liquid silicone rubber coating composition comprising (A) an organopolysiloxane containing at least two silicon-bonded alkenyl radicals, (B) an organohydrogenpolysiloxane containing at least two SiH radicals, (C) an addition reaction catalyst, optionally (D) finely divided silica, (E) triallyl isocyanurate, (F) an organosilicon compound containing an epoxy radical and a silicon-bonded alkoxy radical, and (G) a titanium or zirconium compound is coated on a surface of an airbag base fabric and cured to form a rubber coating layer thereon. The composition is suited for curtain airbags.

10 Claims, No Drawings

US 7,534,499 B2

LIQUID SILICONE RUBBER COATING COMPOSITION, CURTAIN AIRBAG AND MAKING METHOD

CROSS-REFERENCE TO RELATED APPLICATION

This non-provisional application claims priority under 35 U.S.C. §119(a) on patent application No. 2006-005817 filed in Japan on Jan. 13, 2006, the entire contents of which are hereby incorporated by reference.

TECHNICAL FIELD

This invention relates to a liquid silicone rubber coating composition suitable for curtain airbags, a curtain airbag having a rubber coating layer of the cured composition, and a method for preparing the curtain airbag.

Airbags for vehicles are generally manufactured by coating textile fabric such as nylon 66, nylon 6 or polyester with a silicone rubber coating layer and include ordinary airbags which are installed at the front seats and curtain airbags which are installed from the front pillar to the roof side. The curtain airbags have to stay inflated longer for protecting the head and preventing the passengers from being ejected upon collision or rollover.

BACKGROUND ART

A number of silicone rubber compositions for airbags for forming a rubber coating on textile surface are known. For example, JP-A 5-214295 corresponding to U.S. Pat. No. 5,877,256 discloses a silicone rubber composition in which an inorganic filler, siloxane resin, and epoxy-containing silicon compound are added to an addition cure silicone compound, the composition having improved adhesion to base fabric. JP-A 2002-138249 discloses an airbag-forming silicone rubber composition in which an inorganic filler, siloxane resin, organotitanium compound, and alkyl silicate are added to an addition cure silicone compound, the composition being curable by brief heating and having improved adhesion to base fabric. JP-A 2001-287610 discloses an airbag-forming silicone rubber composition in which a vinyl-containing siloxane has a limited viscosity of less than 8,000 centipoises, the composition having a thin-film coating ability. JP-A 2001-59052 corresponding to U.S. Pat. No. 6,387,520 discloses a rubber coating composition having added thereto wet silica having an average specific surface area of 150 to 250 $m^2/g$ as measured by the BET method and an average particle size of no more than 20 μm, the composition being suitable for forming rubber coated textile with minimized tack.

However, when used in curtain airbag application, these compositions are less adherent to airbag base fabric and unsatisfactory in preventing leakage of inflator gas and sustaining inflation for a certain time.

As to an addition composition having a triallyl isocyanurate compound incorporated, JP-A 3-37265 corresponding to U.S. Pat. No. 5,106,933 discloses that a combination of at least two of a triallyl isocyanurate compound, an organosilicon compound containing silicon-bonded (meth)acryloxy-alkyl and alkoxy radicals, and an organosilicon compound containing silicon-bonded epoxy and alkoxy radicals is effective for improving the adhesion to plastic materials. This patent, however, does not discuss the adhesion to such resins as nylon 66, nylon 6 and polyesters, and no reference is made to a combination of a triallyl isocyanurate compound with a titanium or zirconium compound.

DISCLOSURE OF THE INVENTION

An object of the invention is to provide a liquid silicone rubber coating composition having improved adhesion to airbag base fabric, a curtain airbag having a silicone rubber coating layer formed by curing the composition to at least one surface of a substrate, and a method for preparing the curtain airbag.

The inventor has found that when a liquid silicone rubber coating composition comprising (A) an organopolysiloxane containing at least two silicon-bonded alkenyl radicals per molecule, (B) an organohydrogenpolysiloxane containing at least two silicon-bonded hydrogen atoms per molecule, (C) an addition reaction catalyst, optionally (D) finely divided silica, (E) triallyl isocyanurate, (F) an organosilicon compound containing an epoxy radical and a silicon-bonded alkoxy radical per molecule, and (G) a titanium or zirconium compound is used to form a rubber coating layer on a curtain airbag base fabric, the resulting rubber coating layer is fully adherent to the base fabric, allowing the curtain airbag to prevent leakage of inflator gas and to sustain inflation for a certain time.

Accordingly, the present invention provides a liquid silicone rubber coating composition, a curtain airbag, and a method for preparing a curtain airbag, as defined below.

[1] A liquid silicone rubber coating composition to be cured to form a silicone rubber coating layer on at least one surface of the substrate of textile fabric of curtain airbags, comprising (A) 100 parts by weight of an organopolysiloxane containing at least two silicon-bonded alkenyl radicals per molecule, (B) an organohydrogenpolysiloxane containing at least two silicon-bonded hydrogen atoms per molecule, in a sufficient amount to provide 1 to 10 silicon-bonded hydrogen atoms per silicon-bonded alkenyl radical in component (A), (C) a catalytic amount of an addition reaction catalyst, (D) 0 to 50 parts by weight of finely divided silica having a specific surface area of at least 50 $m^2/g$, (E) 0.1 to 1 part by weight of triallyl isocyanurate, (F) 0.1 to 10 parts by weight of an organosilicon compound containing an epoxy radical and a silicon-bonded alkoxy radical per molecule, and (G) 0.1 to 5 parts by weight of a titanium or zirconium compound.

[2] A method for preparing a curtain airbag, comprising the steps of coating at least one surface of a substrate of textile fabric with the liquid silicone rubber coating composition of [1], and curing the composition to form a silicone rubber coating layer on at least one surface of the substrate.

[3] A curtain airbag comprising a substrate of textile fabric and a silicone rubber coating layer formed on at least one surface of the substrate by curing thereto the liquid silicone rubber coating composition of [1].

BENEFITS OF THE INVENTION

The liquid silicone rubber coating composition of the invention has improved adhesion to airbag base fabric. A curtain airbag having a silicone rubber coating layer formed by curing the composition to at least one surface of a substrate is effective for preventing leakage of inflator gas and for sustaining inflation for a certain time.

DESCRIPTION OF THE PREFERRED EMBODIMENTS

Component (A), which is a base polymer of the composition, is an organopolysiloxane having on the molecule at least two alkenyl radicals bonded to silicon atoms. Preferred are organopolysiloxanes having the average compositional formula (1):

  (1)

wherein R is each independently a substituted or unsubstituted monovalent hydrocarbon radical of 1 to 10 carbon atoms, preferably 1 to 8 carbon atoms, and "a" is a positive number in the range of 1.5 to 2.8, preferably 1.8 to 2.5, and more preferably 1.95 to 2.05.

Exemplary of the silicon-bonded alkenyl radicals are those of about 2 to 8 carbons, and preferably about 2 to 4 carbons, such as vinyl, allyl, butenyl, pentenyl, hexenyl and heptenyl. Vinyl is most preferred.

In component (A), the positions of silicon atoms to which alkenyl radicals are bonded in the polysiloxane skeleton include the ends and/or intermediates (non-end positions) of the molecular chain. The preferred component (A) is a linear diorganopolysiloxane containing at least alkenyl radicals bonded to the silicon atoms at both ends of the molecular chain.

The content of alkenyl radicals in component (A) is preferably about 0.001 to 10 mol %, and more preferably about 0.01 to 5 mol %, based on all the monovalent organic radicals bonded to silicon atoms (i.e., substituted or unsubstituted monovalent hydrocarbon radicals represented by R in average compositional formula (1)).

Organic radicals other than alkenyl radicals which may be bonded to silicon atoms on component (A) include unsubstituted or halogen-substituted monovalent hydrocarbon radicals having generally about 1 to 12 carbons, and preferably about 1 to 10 carbons. Specific examples include alkyl radicals such as methyl, ethyl, propyl, butyl, pentyl, hexyl, cyclohexyl and heptyl; aryl radicals such as phenyl, tolyl, xylyl and naphthyl; aralkyl radicals such as benzyl and phenethyl; and haloalkyl radicals such as chloromethyl, 3-chloropropyl and 3,3,3-trifluoropropyl. Methyl and phenyl are most preferred.

Component (A) has a molecular structure which may be, for example, linear, cyclic, or branched. A linear diorganopolysiloxane in which the main chain is basically composed of repeating diorganosiloxane units and both ends of the molecular chain are capped with triorganosiloxy radicals is preferred. Here, "organo" radicals may include alkenyl radicals as well.

Component (A) preferably has a viscosity at 25° C. in the range of 100 to 500,000 mPa·s, and more preferably 300 to 100,000 mPa·s, for the reason that the resulting silicone rubber has good physical properties and the resulting composition is easy to handle and work with. Herein and throughout the specification, the viscosity is measured at 25° C. by a rotational viscometer or the like.

Illustrative examples of suitable organopolysiloxanes that may be used as component (A) include trimethylsiloxy-endcapped dimethylsiloxane-methylvinylsiloxane copolymers, trimethylsiloxy-endcapped methylvinylpolysiloxanes, trimethylsiloxy-endcapped dimethylsiloxane-methylvinylsiloxane-methylphenylsiloxane copolymers, dimethylvinylsiloxy-endcapped dimethylpolysiloxanes, dimethylvinylsiloxy-endcapped methylvinylpolysiloxanes, dimethylvinylsiloxy-endcapped dimethylsiloxane-methylvinylsiloxane copolymers, dimethylvinylsiloxy-endcapped dimethylsiloxane-methylvinylsiloxane-methylphenylsiloxane copolymers, divinylmethylsiloxy-endcapped dimethylpolysiloxanes, divinylmethylsiloxy-endcapped dimethylsiloxane-methylvinylsiloxane copolymers, trivinylsiloxy-endcapped dimethylpolysiloxanes, trivinylsiloxy-endcapped dimethylsiloxane-methylvinylsiloxane copolymers, organosiloxane copolymers composed of siloxane units of the formula $R^1_3SiO_{0.5}$, siloxane units of the formula $R^1_2R^2SiO_{0.5}$, siloxane units of the formula $R^1_2SiO$, and siloxane units of the formula $SiO_2$, organosiloxane copolymers composed of siloxane units of the formula $R^1_3SiO_{0.5}$, siloxane units of the formula $R^1_2R^2SiO_{0.5}$, and siloxane units of the formula $SiO_2$, organosiloxane copolymers composed of siloxane units of the formula $R^1_2R^2SiO_{0.5}$, siloxane units of the formula $R^1_2SiO$, and siloxane units of the formula $SiO_2$, organosiloxane copolymers composed of siloxane units of the formula $R^1R^2SiO$ and siloxane units of the formula $R^1SiO_{1.5}$, or siloxane units of the formula $R^2SiO_{1.5}$, and mixtures of two or more of these organopolysiloxanes. As used herein and throughout the specification, the term "end-capped" means that a siloxane is capped at both ends of the molecular chain with the referenced radicals, unless otherwise stated.

In the above formulas, $R^1$ is a substituted or unsubstituted monovalent hydrocarbon radical other than alkenyl. Specific examples include alkyls such as methyl, ethyl, propyl, butyl, pentyl, hexyl, cyclohexyl and heptyl; aryls such as phenyl, tolyl, xylyl and naphthyl; aralkyls such as benzyl and phenethyl; and haloalkyls such as chloromethyl, 3-chloropropyl and 3,3,3-trifluoropropyl. $R^2$ is an alkenyl radical, examples of which include vinyl, allyl, butenyl, pentenyl, hexenyl and heptenyl.

Component (B) is an organohydrogenpolysiloxane which reacts with component (A) and serves as a crosslinking agent. Its molecular structure is not particularly limited. Any of various organohydrogenpolysiloxanes synthesized in the prior art and having, for example, a linear, cyclic, branched or three-dimensional network (resinous) structure may be used. The organohydrogenpolysiloxane should have on the molecule at least two, and preferably at least three, silicon-bonded hydrogen atoms (hydrosilyl radicals represented by the formula SiH). It generally has about 2 to 300, preferably about 3 to 200, and more preferably about 3 to 100, SiH radicals. Organohydrogenpolysiloxanes having the following average compositional formula (2) may be used as component (B).

  (2)

In formula (2), $R^3$ is a substituted or unsubstituted monovalent hydrocarbon radical bonded to a silicon atom, which preferably has 1 to 10 carbon atoms and which is free of aliphatic unsaturation. Illustrative examples of the substituted or unsubstituted monovalent hydrocarbon radicals represented by $R^3$ include alkyl radicals such as methyl, ethyl, propyl, isopropyl, butyl, isobutyl, tert-butyl, pentyl, neopentyl, hexyl, cyclohexyl, octyl, nonyl and decyl; aryl radicals such as phenyl, tolyl, xylyl and naphthyl; aralkyl radicals such as benzyl, phenylethyl and phenylpropyl; and substituted forms of the foregoing radicals in which some or all of the hydrogens are substituted by halogen atoms such as fluorine, bromine or chlorine, specific examples of which include chloromethyl, chloropropyl, bromoethyl and trifluoropropyl. The substituted or unsubstituted monovalent hydrocarbon radical represented by $R^3$ is preferably an alkyl or aryl, and more preferably methyl or phenyl. The letter b is a positive number from 0.7 to 2.1, c is a positive number from 0.001 to 1.0, and the sum b+c is a positive number from 0.8 to 3.0. Preferably, b is from 1.0 to 2.0, c is from 0.01 to 1.0, and b+c is from 1.5 to 2.5.

Two or more, and preferably three or more, SiH radicals on the molecule may be located at the ends of the molecular chain or at intermediate positions on the chain, or both.

Although the organohydrogenpolysiloxane may have a linear, cyclic, branched or three-dimensional network structure, it is advantageous to use an organohydrogenpolysiloxane in which the number of silicon atoms per molecule (degree of polymerization) is generally about 2 to 300, preferably about 3 to 200, and more preferably about 4 to 150; which has a viscosity at 25° C. of generally about 0.1 to 1,000 mPa-s, preferably about 0.5 to 500 mPa-s; and which is liquid at room temperature (25° C.).

Illustrative examples of suitable organohydrogenpolysiloxanes that may be used as component (B) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymers, trimethylsiloxy-endcapped methylhydrogenpolysiloxanes, trimethylsiloxy-endcapped dimethylsiloxane-methylhydrogensiloxane copolymers, trimethylsiloxy-endcapped dimethylsiloxane-methylhydrogensiloxane-methylphenylsiloxane copolymers, trimethylsiloxy-endcapped dimethylsiloxane-methylhydrogensiloxane-diphenylsiloxane copolymers, dimethylhydrogensiloxy-endcapped methylhydrogenpolysiloxanes, dimethylhydrogensiloxy-endcapped dimethylpolysiloxanes, dimethylhydrogensiloxy-endcapped dimethylsiloxane-methylhydrogensiloxane copolymers, dimethylhydrogensiloxy-endcapped dimethylsiloxane-methylphenylsiloxane copolymers, dimethylhydrogensiloxy-endcapped dimethylsiloxane-diphenylsiloxane copolymers, dimethylhydrogensiloxy-endcapped methylphenylpolysiloxanes, dimethylhydrogensiloxy-endcapped diphenylpolysiloxanes, and substituted forms of the foregoing in which some or all methyl radicals are substituted by other alkyl radicals such as ethyl or propyl, as well as organosiloxane copolymers composed of siloxane units of the formula $R^3{}_3SiO_{0.5}$, siloxane units of the formula $R^3{}_2HSiO_{0.5}$, and siloxane units of the formula $SiO_2$, organosiloxane copolymers composed of siloxane units of the formula $R^3{}_2HSiO_{0.5}$ and siloxane units of the formula $SiO_2$, organosiloxane copolymers composed of siloxane units of the formula $R^3HSiO$ and siloxane units of the formula $R^3SiO_{1.5}$ or siloxane units of the formula $HSiO_{1.5}$, and mixtures of two or more of these organopolysiloxanes. $R^3$ in the above formulas represents substituted or unsubstituted monovalent hydrocarbon radicals other than alkenyl, and is exemplified by the same radicals as those mentioned above.

Component (B) is preferably compounded in such an amount as to provide 1 to 10 moles, and more preferably 1 to 5 moles, of silicon-bonded hydrogen atoms in component (B) per mole of silicon-bonded alkenyl radicals in component (A), that is, 1 to 10, and more preferably 1 to 5 silicon-bonded hydrogen atoms per alkenyl radical, although the amount is not limited thereto. If the amount of silicon-bonded hydrogen atoms in component (B) is less than 1 mole per mole of silicon-bonded alkenyl radicals in component (A), the composition may not cure to a full extent. On the other hand, the inclusion of more than 10 moles excessively diminishes the heat resistance of silicone rubber.

Component (C) is an addition reaction catalyst. Any of such catalysts may be used as long as they can promote the hydrosilylating addition reaction between silicon-bonded alkenyl radicals in component (A) and SiH radicals in component (B). Examples of suitable catalysts include platinum group metals and their compounds such as platinum, palladium, rhodium, chloroplatinic acid, alcohol-modified chloroplatinic acid, coordination compounds of chloroplatinic acid with olefins, vinylsiloxane or acetylene compounds, tetrakis(triphenylphosphine)palladium, chlorotris(triphenylphosphine)rhodium, and the like. Platinum compounds are most preferred.

The addition reaction catalyst is compounded in a catalytic amount, preferably in an amount of 1 to 500 ppm, and more preferably 10 to 100 ppm, expressed as the weight of catalyst metal element based on the combined weight of components (A) and (B). At less than 1 ppm, the addition reaction may become very slow or curing may not take place. On the other hand, too much amounts add to the cost, rendering the composition uneconomical.

Component (D), which is optional, is finely divided silica which serves as a reinforcement, that is, to impart a high tear strength to the inventive composition. Use of finely divided silica as the reinforcement enables to form a coating layer which fulfills the tear strength properties required in the preferred embodiment of the invention. The finely divided silica should have a specific surface area of at least 50 m²/g, preferably 50 to 400 m²/g, and more preferably 100 to 300 m²/g, as measured by the BET method. At a specific surface area of less than 50 m²/g, satisfactory tear strength properties cannot be achieved.

In the practice of the invention, the finely divided silica may be any known silica used as a reinforcing filler for silicone rubber, provided the silica has a specific surface area within the above-indicated range. Exemplary silicas include fumed silica and precipitated silica. Any one or combinations of two or more thereof may be used. Such finely divided silica may be used directly without modification. However, it is advantageous to treat silica with organosilicon compounds prior to use in order to impart a good flow to the inventive composition. Exemplary organosilicon compounds include methylchlorosilanes such as trimethylchlorosilane, dimethyldichlorosilane, and methyltrichlorosilane, dimethylpolysiloxane, and hexaorganodisilazanes such as hexamethyldisilazane, divinyltetramethyldisilazane, and dimethyltetravinyldisilazane.

When component (D) is used, the amount of component (D) compounded is up to 50 parts by weight (i.e., 0 to 50 parts by weight) per 100 parts by weight of the organopolysiloxane (A). An appropriate amount of component (D) is generally 0.1 to 50 parts by weight, preferably 1 to 50 parts by weight, and more preferably 5 to 40 parts by weight. Too less amounts may fail to provide the desired tear strength whereas too much component (D) may compromise the flow of the composition, making the coating operation more difficult to carry out.

Component (E) is triallyl isocyanurate. The inventive composition is characterized by this component in that it serves to improve the adhesion of the composition to synthetic fiber woven fabric substrates, non-woven fabric substrates, and thermoplastic resin sheet- or film-like substrates for airbags. It is essential that the triallyl isocyanurate have three allyl radicals bonded to nitrogen atoms per molecule. Component (E) excludes modified forms of triallyl isocyanurate compounds in which one or more of the three allyl radicals are modified into silyl-substituted alkyl radicals such as trialkylsilylpropyl radicals through addition of trialkylsilyl radicals, because they fail to exert the desired effect.

The amount of component (E) added is 0.1 to 1 part by weight per 100 parts by weight of component (A). With less than 0.1 pbw of component (E), the resulting composition is less self-adhesive to airbag base fabric. More than 1 pbw interferes with the curing property.

Component (F) is an organosilicon compound containing an epoxy radical and a silicon-bonded alkoxy radical per molecule. Although any of such organosilicon compounds may be used, organosilicon compounds such as silanes and cyclic or linear siloxanes of 2 to about 30 silicon atoms, preferably 4 to about 20 silicon atoms, having at least one epoxy radical and at least two silicon-bonded alkoxy radicals are preferred for the attainment of adhesion.

In a preferred embodiment, the epoxy radical is bonded to a silicon atom in the form of a glycidoxyalkyl radical such as glycidoxypropyl, or an epoxy-bearing cyclohexylalkyl radical such as 2,3-epoxycyclohexylethyl or 3,4-epoxycyclohexylethyl. The preferred silicon-bonded alkoxy radicals are trialkylsilyl and alkyldialkoxysilyl radicals such as trimethylsilyl, triethylsilyl, methyldimethoxysilyl, ethyldimethoxysilyl, methyldiethoxysilyl, and ethyldiethoxysilyl.

The organosilicon compound (F) may contain a functional radical other than the epoxy radical and silicon-bonded alkoxy radical, the functional radical being at least one type selected from among alkenyl radicals such as vinyl, (meth) acryloxy radicals, and hydrosilyl (SiH) radicals.

Examples of the organosilicon compound (F) include organosilicon compounds of the chemical formulas shown below, mixtures of two or more thereof, and partial hydrolytic condensates of one or more thereof.

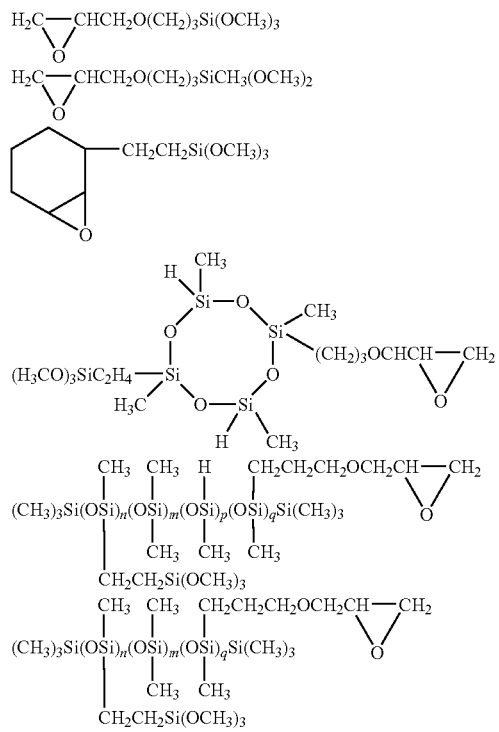

Herein, n is an integer of 1 to 10, m is an integer of 0 to 100, and preferably 0 to 20, p is an integer of 1 to 100, and preferably 1 to 20, and q is an integer of 1 to 10.

The amount of component (F) added is 0.1 to 10 parts by weight and preferably 0.1 to 5 parts by weight per 100 parts by weight of component (A). With less than 0.1 pbw of component (F), the resulting composition is not self-adhesive. More than 10 pbw of component (F) can detract from the physical properties of the cured composition.

Component (G) is an organic titanium or zirconium compound, which serves as a condensation co-catalyst for enhancing adhesion. Exemplary of component (G) are titanium-based condensation co-catalysts including organic titanate esters such as tetraisopropyl titanate and tetrabutyl titanate, and organic titanium chelate compounds such as diisopropoxy(acetylacetate)titanium, diisopropoxy(ethylacetoacetate)titanium and tetraacetylacetate titanium; and zirconium-based condensation co-catalysts including organic zirconium esters such as zirconium tetrapropylate and zirconium tetrabutyrate, and organic zirconium chelate compounds such as zirconium tributoxyacetylacetate, zirconium butoxyacetylacetonate bisethylacetoacetate, and zirconium tetraacetylacetonate.

The amount of component (G) added is 0.1 to 5 parts by weight and preferably 0.2 to 2 parts by weight per 100 parts by weight of component (A). With less than 0.1 pbw of component (G), adhesion permanence under hot humid conditions declines. More than 5 pbw of component (G) can detract from the heat resistance of the cured composition.

In addition to the foregoing components (A) to (F), the coating composition of the invention may further include optional components. Typically, any of regulator compounds which are known to have a cure inhibiting effect on the addition reaction catalyst may be used as an additional component. Examples of such regulator include phosphorus-containing compounds such as triphenylphosphine, nitrogen-containing compounds such as tributylamine, tetramethylethylenediamine and benzotriazole, sulfur-containing compounds, acetylene compounds, compounds having two or more alkenyl radicals, hydroperoxy compounds and malic acid derivatives. The extent of the cure-retarding effect achieved by the regulator varies considerably according to the chemical structure of the regulator. It is thus preferable to adjust the amount of regulator included in the composition so as to be optimal for a particular regulator compound used. Generally, the addition of too little regulator may fail to provide long-term shelf stability at room temperature, whereas the addition of too much may impede curing.

Other optional components include inorganic fillers such as crystalline silica, hollow fillers, silsesquioxane, fumed titanium dioxide, magnesium oxide, zinc oxide, iron oxide, aluminum hydroxide, magnesium carbonate, calcium carbonate, zinc carbonate, sheet mica, carbon black, diatomaceous earth, and glass fibers; and these fillers that have been surface-treated with organosilicon compounds such as organoalkoxysilane compounds, organochlorosilane compounds, organosilazane compounds or low-molecular-weight siloxane compounds. Silicone rubber powders and silicone resin powders are also included.

Insofar as the objects of the invention may be attained, the coating composition of the invention may further include as optional components organopolysiloxanes having on the molecule one silicon-bonded hydrogen atom or alkenyl radical and bearing no other functional radicals, non-functional organopolysiloxanes having no silicon-bonded hydrogen atoms or alkenyl radicals, organic solvents, creep hardening inhibitors, plasticizers, thixotropic agents, pigments, dyes and mildew-proofing agents.

The liquid silicone rubber coating composition of the invention may be prepared by mixing together the components by a standard technique.

The resulting liquid silicone rubber coating composition is fully adherent to airbag base fabrics and is particularly useful as coatings for curtain airbags which are installed from the front pillar to the roof side of automobiles and which have to stay inflated longer for protecting the head and preventing the passengers from being ejected upon collision or rollover.

Airbags, especially curtain airbags, on which a silicone rubber coating layer is formed from the inventive composition, may be of well-known construction. The base fabric used therein is a woven fabric made of synthetic fiber, such as nylon 66, nylon 6, polyester fiber, aramid fiber, various types of polyamide fiber and various types of polyester fiber. The airbags include plain-weave airbags which are made by joining a pair of plain-woven base fabric sheets (lined with rubber on the inside surface) along the periphery edge together with an adhesive, and stitching the edges together through the adhesive layer; and hollow-weave airbags which are made as a bag by hollow weaving.

The silicone rubber-coated base fabric for curtain airbags may be prepared by coating the liquid silicone rubber coating composition to at least one surface, typically one surface of a substrate of textile fabric, and placing the coated substrate in a hot air drying oven for heat curing the composition to form a silicone rubber coating layer on the substrate.

The substrate of textile fabric used herein include substrates comprising a base fabric selected from woven fabrics of the above-mentioned various types of synthetic fiber. A conventional method may be used to coat the inventive composition onto a substrate surface. The coating weight of the composition (or thickness of coating layer) is generally about 10 to 150 $g/m^2$, preferably about 15 to 80 $g/m^2$, and most preferably about 20 to 60 $g/m^2$.

Curing methods and conditions known to the art may be used for curing the coating compositions. Generally, the composition can be cured at a temperature of 120 to 180° C. for a period of 1 to 10 minutes.

EXAMPLES

Examples and comparative examples are given below for illustrating the invention, but not intended to limit the scope thereof. In these examples, all parts are by weight. The viscosity values were obtained at 25° C.

Example 1

Into a kneader were admitted 65 parts of a vinyldimethylsilyl-endcapped dimethylpolysiloxane having a viscosity of about 30,000 mPa-s, 8 parts of hexamethyldisiloxane, 2 parts of water, and 40 parts of fumed silica having a specific surface area of about 300 $m^2/g$ by the BET method (Aerosil 300, Nippon Aerosil Co., Ltd.). The contents were mixed for one hour, after which the mixture was heated to a temperature of 150° C. and mixed for a further 2 hours.

Thereafter, the mixture was cooled to room temperature, to which were added 19 parts of vinyldimethylsilyl-endcapped dimethylpolysiloxane having a viscosity of about 30,000 mPa-s and 5 parts of a dimethylpolysiloxane containing 5 mol % of vinylmethylsilyl units and having a viscosity of about 700 mPa-s. The ingredients were mixed until uniform, obtaining Base Compound I.

A composition A was prepared by mixing together the following ingredients: 64 parts of Base Compound I, 5 parts of a vinyldimethylsilyl-endcapped dimethylpolysiloxane containing 0.18 mol % of vinylmethylsilyl units and having a viscosity of about 30,000 mPa-s, 10 parts of a vinyldimethylsilyl-endcapped dimethylpolysiloxane having a viscosity of about 30,000 mPa-s, 47 parts of a vinyldimethylsilyl-endcapped dimethylpolysiloxane having a viscosity of about 100,000 mPa-s, 1.35 parts of a dimethylsiloxane-methylhydrogensiloxane copolymer having a viscosity of 10 mPa-s and having silicon-bonded hydrogen atoms on side chains off the molecular chain (silicon-bonded hydrogen atom content, 0.82 wt %), 0.07 part of 1-ethynylcyclohexanol, 0.25 part of a dimethylpolysiloxane solution of chloroplatinic acid/1,3-divinyltetramethyl-disiloxane complex (platinum atom content, 1 wt %), 0.26 part of triallyl isocyanurate, 0.65 part of γ-glycidoxypropyltrimethoxysilane, and 0.28 part of zirconium butoxyacetylacetonate bisethylacetoacetate.

The composition was press-cured at 150° C. for 5 minutes and post-cured at 150° C. for one hour into a sheet, which was measured for hardness, elongation and tear strength in accordance with JIS K-6249.

Separately, the silicone rubber composition was uniformly coated onto an airbag nylon 66 base fabric with a coater to a coating weight of 80 $g/cm^2$, and heat cured in an oven at 170° C. for one minute. The peel adhesion force of the silicone rubber coating layer to the nylon base fabric was measured as follows. Two sheets of silicone rubber-coated nylon base fabric having a width of 50 mm were joined together by sandwiching an addition type RTV silicone adhesive X-32-2600A/B between them so as to give an adhesive thickness of 0.6 mm and holding at 23° C. for 24 hours for the adhesive to cure. The resulting laminate was cut into strips of 20 mm wide and the strip was subjected to a T peel strength test at a pull rate of 200 mm/min. The results are shown in Table 1.

Example 2

A composition B was prepared by mixing together the following ingredients: 64 parts of Base Compound I obtained in Example 1, 31 parts of a vinyldimethylsilyl-endcapped dimethylpolysiloxane having a viscosity of about 30,000 mPa-s, 35 parts of a dimethylpolysiloxane having a viscosity of about 100,000 mPa-s, 2.2 parts of a dimethylsiloxane-methylhydrogensiloxane copolymer having a viscosity of 140 mPa-s and having silicon-bonded hydrogen atoms on side chains off the molecular chain (silicon-bonded hydrogen atom content, 1.02 wt %), 0.08 part of 1-ethynylcyclohexanol, 0.27 part of tetramethyltetravinyltetrasiloxane, 0.30 part of a dimethylpolysiloxane solution of chloroplatinic acid/1,3-divinyltetramethyldisiloxane complex (platinum atom content, 1 wt %), 0.26 part of triallyl isocyanurate, 0.7 part of γ-glycidoxypropyltrimethoxysilane, and 0.4 part of zirconium tetraacetylacetonate.

As in Example 1, the composition was subjected to the cured physical properties test and peel adhesion test. The results are shown in Table 1.

Example 3

Into a kneader were admitted 65 parts of a vinyldimethylsilyl-endcapped dimethylpolysiloxane having a viscosity of about 30,000 mPa-s, 8 parts of hexamethyldisiloxane, 0.1 part of 1,3-divinyl-1,1,3,3-tetramethyldisilazane, 2 parts of water, and 40 parts of fumed silica having a specific surface area of about 300 $m^2/g$ by the BET method (Aerosil 300, Nippon Aerosil Co., Ltd.). The contents were mixed for one hour, after which the mixture was heated to a temperature of 150° C. and mixed for a further 2 hours.

Thereafter, the mixture was cooled to room temperature, to which were added 22 parts of vinyldimethylsilyl-endcapped dimethylpolysiloxane having a viscosity of about 30,000 mPa-s and 2 parts of a dimethylpolysiloxane containing 5 mol % of vinylmethylsilyl units and having a viscosity of about 700 mPa-s. The ingredients were mixed until uniform, obtaining Base Compound II.

A composition C was prepared by mixing together the following ingredients: 64 parts of Base Compound II, 15 parts of a vinyldimethylsilyl-endcapped dimethylpolysiloxane having a viscosity of about 30,000 mPa-s, 47 parts of a vinyldimethylsilyl-endcapped dimethylpolysiloxane having a viscosity of about 10,000 mPa-s, 1.5 parts of a dimethylpolysiloxane having a viscosity of 18 mPa-s and having silicon-bonded hydrogen atoms at both ends of the molecular chain (silicon-bonded hydrogen atom content, 0.13 wt %), 1.2 parts of a dimethylsiloxane-methylhydrogensiloxane copolymer having a viscosity of 10 mPa-s and having silicon-bonded hydrogen atoms on side chains off the molecular chain (silicon-bonded hydrogen atom content, 0.82 wt %), 0.07 part of 1-ethynylcyclohexanol, 0.25 part of a dimethylpolysiloxane solution of chloroplatinic acid/1,3-divinyltetramethyldisiloxane complex (platinum atom content, 1 wt %), 0.26 part of triallyl isocyanurate, 0.70 part of 2-(3,4-epoxycyclohexylethyl)trimethoxysilane, and 0.28 part of zirconium butoxyacetylacetonate bisethylacetoacetate.

As in Example 1, the composition was subjected to the cured physical properties test and peel adhesion test. The results are shown in Table 1.

Example 4

A composition D was prepared by mixing together the following ingredients: 78 parts of Base Compound I obtained in Example 1, 35 parts of a vinyldimethylsilyl-endcapped dimethylpolysiloxane having a viscosity of about 5,000 mPa-s, 15 parts of a dimethylpolysiloxane having a viscosity of about 1,000 mPa-s, 5 parts of an organopolysiloxane resin consisting of 39.5 mol % of $(CH_3)_3SiO_{1/2}$ units, 6.5 mol % of $(CH_3)_2(CH_2=CH)SiO_{1/2}$ units, and 54 mol % of $SiO_2$ units, 6.4 parts of a dimethylsiloxane-methylhydrogensiloxane copolymer having a viscosity of 45 mPa-s and having silicon-bonded hydrogen atoms on side chains off the molecular chain (silicon-bonded hydrogen atom content, 1.08 wt %), 0.09 part of 1-ethynylcyclohexanol, 0.38 part of a dimethylpolysiloxane solution of chloroplatinic acid/1,3-divinyltetramethyl-disiloxane complex (platinum atom content, 1 wt %), 0.3 part of triallyl isocyanurate, 0.3 part of γ-glycidoxypropyltrimethoxysilane, and 0.2 part of octyl titanate.

As in Example 1, the composition was subjected to the cured physical properties test and peel adhesion test. The results are shown in Table 1.

TABLE 1

|  | Example | | | |
| --- | --- | --- | --- | --- |
|  | 1 | 2 | 3 | 4 |
| Hardness (Durometer type A) | 26 | 32 | 26 | 47 |
| Elongation at break (%) | 650 | 670 | 700 | 330 |
| Tensile strength (MPa) | 4.1 | 5.2 | 4.5 | 5.5 |
| Tear strength (kN/m) | 16 | 20 | 21 | 27 |
| Peel adhesion force (N/cm) | 30 | 43 | 30 | 50 |

Comparative Example 1

A composition E was prepared as in Example 1 aside from omitting triallyl isocyanurate. As in Example 1, the composition was subjected to the cured physical properties test and peel adhesion test The results are shown in Table 2.

Comparative Example 2

A composition F was prepared as in Example 1 aside from omitting zirconium butoxyacetylacetonate bisethylacetoacetate. As in Example 1, the composition was subjected to the cured physical properties test and peel adhesion test. The results are shown in Table 2.

Comparative Example 3

A composition G was prepared as in Example 1 aside from omitting γ-glycidoxypropyltrimethoxysilane. As in Example 1, the composition was subjected to the cured physical properties test and peel adhesion test. The results are shown in Table 2.

Comparative Example 4

A composition was prepared as in Example 4 aside from omitting triallyl isocyanurate. As in Example 1, the composition was subjected to the cured physical properties test and peel adhesion test. The results are shown in Table 2.

Comparative Example 5

A composition was prepared as in Example 4 aside from omitting octyl titanate. As in Example 1, the composition was subjected to the cured physical properties test and peel adhesion test. The results are shown in Table 2.

Comparative Example 6

A composition was prepared as in Example 4 aside from omitting γ-glycidoxypropyltrimethoxysilane. As in Example 1, the composition was subjected to the cured physical properties test and peel adhesion test. The results are shown in Table 2.

TABLE 2

|  | Comparative Example | | | | | |
| --- | --- | --- | --- | --- | --- | --- |
|  | 1 | 2 | 3 | 4 | 5 | 6 |
| Hardness (Durometer type A) | 28 | 28 | 25 | 48 | 46 | 46 |
| Elongation at break (%) | 650 | 640 | 670 | 300 | 370 | 380 |
| Tensile strength (MPa) | 5.3 | 5.1 | 5.2 | 5.9 | 5.4 | 5.5 |
| Tear strength (kN/m) | 18 | 18 | 18 | 25 | 25 | 25 |
| Peel adhesion force (N/cm) | 18 | 15 | 10 | 35 | 27 | 20 |

Japanese Patent Application No. 2006-005817 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A liquid silicone rubber coating composition to be cured to form a silicone rubber coating layer on at least one surface of the substrate of textile fabric of curtain airbags, comprising
    (A) 100 parts by weight of an organopolysiloxane containing at least two silicon-bonded alkenyl radicals per molecule,
    (B) an organohydrogenpolysiloxane containing at least two silicon-bonded hydrogen atoms per molecule, in a sufficient amount to provide 1 to 10 silicon-bonded hydrogen atoms per silicon-bonded alkenyl radical in component (A),
    (C) a catalytic amount of an addition reaction catalyst,
    (D) 0 to 50 parts by weight of finely divided silica having a specific surface area of at least 50 $m^2/g$, (E) 0.1 to 1 part by weight of triallyl isocyanurate,
(F) 0.1 to 10 parts by weight of an organosilicon compound containing an epoxy radical and a silicon-bonded alkoxy radical per molecule, and
(G) 0.1 to 5 parts by weight of a titanium or zirconium compound.

2. A method for preparing a curtain airbag, comprising the steps of coating at least one surface of a substrate of textile fabric with the liquid silicone rubber coating composition of claim 1, and curing the composition to form a silicone rubber coating layer on at least one surface of the substrate.

3. A curtain airbag comprising a substrate of textile fabric and a silicone rubber coating layer formed on at least one surface of the substrate by curing thereto the liquid silicone rubber coating composition of claim 1.

4. The liquid silicone rubber coating composition according to claim 1, further comprising at least one selected from the group consisting of a regulator compound known to have a cure inhibiting effect, an inorganic filler, an organopolysiloxane comprising one silicon hydrogen and no other functional radical, an organopolysiloxane comprising one alkenyl radical and no other functional radical, and a non-functional organopolysiloxane, an organic solvent, a creep hardening inhibitor, a plasticizer, a thixotropic agent, a pigment, a dye and a mildew-proofing agent.

5. The liquid silicone rubber coating composition according to claim 1, wherein the textile fabric is a woven fabric comprising a synthetic fiber selected from the group consisting of nylon 66, nylon 6, polyester, aramid and polyamid.

6. The liquid silicone rubber coating composition according to claim 1, wherein the titanium or zirconium compound is at least one selected from the group consisting of tetraisopropyl titanate, tetrabutyl titanate, diisopropoxy(acetylacetate)titanium, diisopropoxy(ethylacetoacetate)titanium, tetraacetylacetate titanium, zirconium tetrapropylate, zirconium tetrabutyrate, zirconium tributoxyacetylacetate, zirconium butoxyacetylacetonate bisethylacetoacetate, and zirconium tetraacetylacetonate.

7. The curtain airbag according to claim 3 wherein all surfaces of the airbag comprise the silicone rubber coating layer.

8. The liquid silicon rubber coating composition according to claim 1, wherein:
the organopolysiloxane containing at least two silicon-bonded alkenyl radicals per molecule of component (A) has the average compositional formula (1):

$$R_a SiO_{(4-a)/2} \quad (1)$$

wherein:
R is each independently a substituted or unsubstituted monovalent hydrocarbon radical of 1 to 10 carbon atoms;
a is a positive number in the range of 1.5 to 2.8;
the content of the alkenyl radicals is about 0.001 to 10 mole % based on all the substituted or unsubstituted monovalent hydrocarbon radicals represented by R;
the organohydrogenpolysiloxane containing at least two silicon-bonded hydrogen atoms per molecule of component (B) has the following average compositional formula (2):

$$R^3_b H_c SiO_{(4-b-c)/2} \quad (2)$$

wherein:
R³ is a substituted or substituted monovalent hydrocarbon radical of 1 to 10 carbon atoms which is free of aliphatic unsaturation;
b is a positive number from 0.7 to 2.1;
c is a positive number from 0.001 to 1.0; and
(b +c) is a positive number from 0.8 to 3.0; and
the addition reaction catalyst of component (C) is one selected from the group consisting of platinum group metals and their compounds.

9. The liquid silicon rubber coating composition according to claim 1, wherein the organosilicon compound of component (F) is at least one selected from the group consisting of a silane of 2 to 30 silicon atoms, a cyclic siloxane of 2 to 30 silicon atoms and a cyclic siloxane of 2 to 30 silicon atoms.

10. The liquid silicon rubber coating composition according to claim 1, wherein the organosilicon compound of component (F) is at least one organosilicon compound selected from the group consisting of

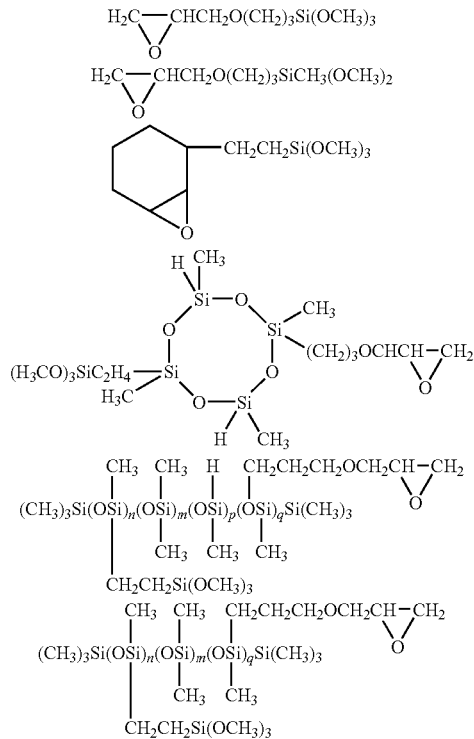

mixtures thereof, and
partial hydrolytic condensates of one or more thereof;
wherein;
n is an integer of 1 to 10,
m is an integer of 0 to 100,
p is an integer of 1 to 100, and
q is an integer of 1 to 100.

* * * * *